United States Patent
Bartholomew et al.

(10) Patent No.: US 10,771,585 B2
(45) Date of Patent: *Sep. 8, 2020

(54) LIMITING CLIENT SIDE DATA STORAGE BASED UPON CLIENT GEO-LOCATION

(71) Applicant: International Business Machines Corporation, Armonk, NY (US)

(72) Inventors: Erin Bartholomew, Chicago, IL (US); Nicholas D. Gibson, Cary, NC (US); M. Andrew Huffman, Durham, NC (US); Spencer F. Hockeborn, Raleigh, NC (US); Todd E. Kaplinger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/424,443

(22) Filed: May 28, 2019

(65) Prior Publication Data

US 2019/0281131 A1    Sep. 12, 2019

Related U.S. Application Data

(63) Continuation of application No. 14/846,981, filed on Sep. 7, 2015, now Pat. No. 10,306,008.

(51) Int. Cl.
*H04L 29/08* (2006.01)

(52) U.S. Cl.
CPC ...... *H04L 67/2857* (2013.01); *H04L 67/1097* (2013.01)

(58) Field of Classification Search
CPC ....... H04W 64/00; H04W 48/04; H04W 4/02; H04W 52/0251; H04L 67/2842; H04L 67/42; H04L 67/10
See application file for complete search history.

(56) References Cited

U.S. PATENT DOCUMENTS 7,313,825 B2  12/2007  Redlich et al.
8,676,593 B2   3/2014  Nagpal et al.
(Continued)

OTHER PUBLICATIONS

"Bundesdatenschutzgesetz", Wikipedia, This is an old revision of this page, as edited by GaborLajos (talk | contribs) at 12:04, Apr. 16, 2015, 8 pages, <https://en.wikipedia.org/w/index.php? title=Bundesdatenschutzgesetz&oldid=656744407>.
(Continued)

*Primary Examiner* — Hitesh Patel
(74) *Attorney, Agent, or Firm* — William H. Hartwell

(57) ABSTRACT

Embodiments of the present invention provide a method, system and computer program product for limiting client side data storage based upon client geolocation. In an embodiment of the invention, a method for the differentiated treatment of data at rest in a mobile device includes receiving in a cache manager a request to cache data in a cache of a mobile device. Also, a geolocation for the mobile device is retrieved contemporaneous with the receipt of the request. Thereafter, it is determined from the geolocation whether or not the mobile device is present within a restricted geographic zone. Finally, in response to determining that the mobile device is present within a restricted geographic zone, the cache manager is directed to cache the data in a cache in the mobile device. But, otherwise the cache manager is directed to cache the data in a cache disposed in the computer communications network.

5 Claims, 2 Drawing Sheets

(56) References Cited

U.S. PATENT DOCUMENTS

| | | |
|---|---|---|
| 8,949,556 B2 | 2/2015 | Chakra et al. |
| 9,437,272 B1 | 9/2016 | Lu |
| 9,444,805 B1* | 9/2016 | Saylor .................... H04W 4/029 |
| 10,306,008 B2 | 5/2019 | Bartholomew |
| 2010/0311502 A1 | 12/2010 | Miller |
| 2014/0164719 A1* | 6/2014 | Chakra ................ G06F 12/122 |
| | | 711/154 |
| 2014/0244167 A1* | 8/2014 | Reynolds .............. H04W 64/00 |
| | | 701/518 |
| 2015/0248741 A1 | 9/2015 | Iranli |
| 2017/0070591 A1 | 3/2017 | Bartholomew |

OTHER PUBLICATIONS

"Data at rest", Wikipedia, This is an old revision of this page, as edited by Edward (talk | contribs) at 08:15, Dec. 14, 2014 (link enterprise encryption gateway using Find link), 4 pages, <https://en.wikipedia.org/w/index.php? title=Data_at_rest&oldid=638016403>.

"Enable policy to encrypt data at rest—Explore how IBM Security Key Lifecycle Manager 2.5 automates the onerous key management task", IBM, developerWorks, Jan. 20, 2014, 6 pages.

IBM, "List of IBM Patents or Patent Applications Treated As Related", Appendix P, 2 pages, dated Apr. 8, 2020.

* cited by examiner

LIMITING CLIENT SIDE DATA STORAGE BASED UPON CLIENT GEO-LOCATION

CROSS-REFERENCE TO RELATED APPLICATIONS

This application is a Continuation of U.S. patent application Ser. No. 14/846,981, filed Sep. 7, 2015, the entirety of which is incorporated herein by reference.

BACKGROUND OF THE INVENTION

Field of the Invention

The present invention relates to data at rest management and more particularly to data at rest privacy management

Description of the Related Art

Data at Rest is an industrial term that refers to state of data when the data is physically persisted in some sort of static memory but inactive in its use. Data at Rest is one of three states academically described for data, the other two states being "Data in Use" and "Data in Motion". Data in Use refers to data actively and therefore contemporaneously processed in a computer by one or more processors of a computer while resident in dynamic memory. Data in Motion, in turn, refers to data that traverses a computer communications network, or data that resides only temporarily in memory during the course of a read or updating process.

Data security and data privacy is of paramount concern when considering Data at Rest. Data encryption is one way in which data security and data privacy is achieved in respect to Data at Rest. In the context of a single device or a single collection of devices, encryption can be applied at all times in order to further the goal of data privacy. However, encryption is not always a viable methodology for all circumstances of Data at Rest.

In this regard, the convergence of mobile and cloud technologies has introduced a new set of privacy concerns in regard to Data at Rest. More particularly, different national governments provide different regulations in furtherance of different data privacy policies and the corresponding utilization of data. These policies can be specific in relationship to cross-border data transmission and persistence of data—that is, data transmitted from one another jurisdiction to another national jurisdiction. As such, encryption notwithstanding, the placement of data outside of the device in the cloud can be permitted by one set of national regulations, but not by another.

Therefore, without knowing a priori within which national boundaries a device is to be utilized, it is not possible to specifically configure a device to manage Data at Rest therein so as to definitively satisfy the regulatory requirements of that corresponding jurisdiction in respect to data privacy.

BRIEF SUMMARY OF THE INVENTION

Embodiments of the present invention address deficiencies of the art in respect to managing data privacy for Data at Rest and provide a novel and non-obvious method, system and computer program product for limiting client side data storage based upon client geolocation. In an embodiment of the invention, a method for the differentiated treatment of data at rest in a mobile device includes receiving in a cache manager a request to cache data in a cache of a mobile device. Also, a geolocation for the mobile device is retrieved contemporaneous with the receipt of the request. Thereafter, it is determined from the geolocation whether or not the mobile device is present within a restricted geographic zone. Finally, in response to determining that the mobile device is present within a restricted geographic zone, the cache manager is directed to cache the data in a cache in the mobile device. But, otherwise the cache manager is directed to cache the data in a cache disposed in the computer communications network.

In one aspect of the embodiment, the cache manager is disposed within the device. In an alternative aspect of the embodiment, the cache manager is disposed within a server disposed in the computer communications network and is coupled over the computer communications network to the both the mobile device and the cache disposed in the computer communications network.

In another embodiment of the invention, a data processing system is configured for limiting client side data storage based upon client geolocation. The system includes a mobile computing device that has both static and dynamic memory and at least one processor. The system also includes a cache disposed in the static memory. Finally, the system includes a cache manager coupled to the cache disposed in the static memory and also to a remotely disposed cache in a computer communications network. The cache manager includes program code enabled upon execution to receive a request to cache data, to retrieve a geolocation for the mobile device contemporaneous with the receipt of the request, to determine from the geolocation whether or not the mobile device is present within a restricted geographic zone and, to respond to a determination that the mobile device is present within a restricted geographic zone, by caching of the data in the cache disposed in the static memory of the mobile device, but otherwise by caching the data in the remotely disposed cache.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for limiting client side data storage based upon client geolocation. In accordance with an embodiment of the invention, a data manipulation request for data in a Data at Rest state is received in memory of a mobile device from over a computer communications network. The data manipulation request is a request to store data, to cache data, or to retrieve data from a cache. Contemporaneously, a geolocation of the mobile device is determined and it is computed from the geolocation whether or not the mobile device is present within a restricted geographic zone. If so, the data manipulation request is processed in connection with the persistence of the data in a cache of the mobile device. Otherwise the data manipulation request is processed in connection with the persistence of the data in a data store disposed in a computer communications network.

Figure 1:
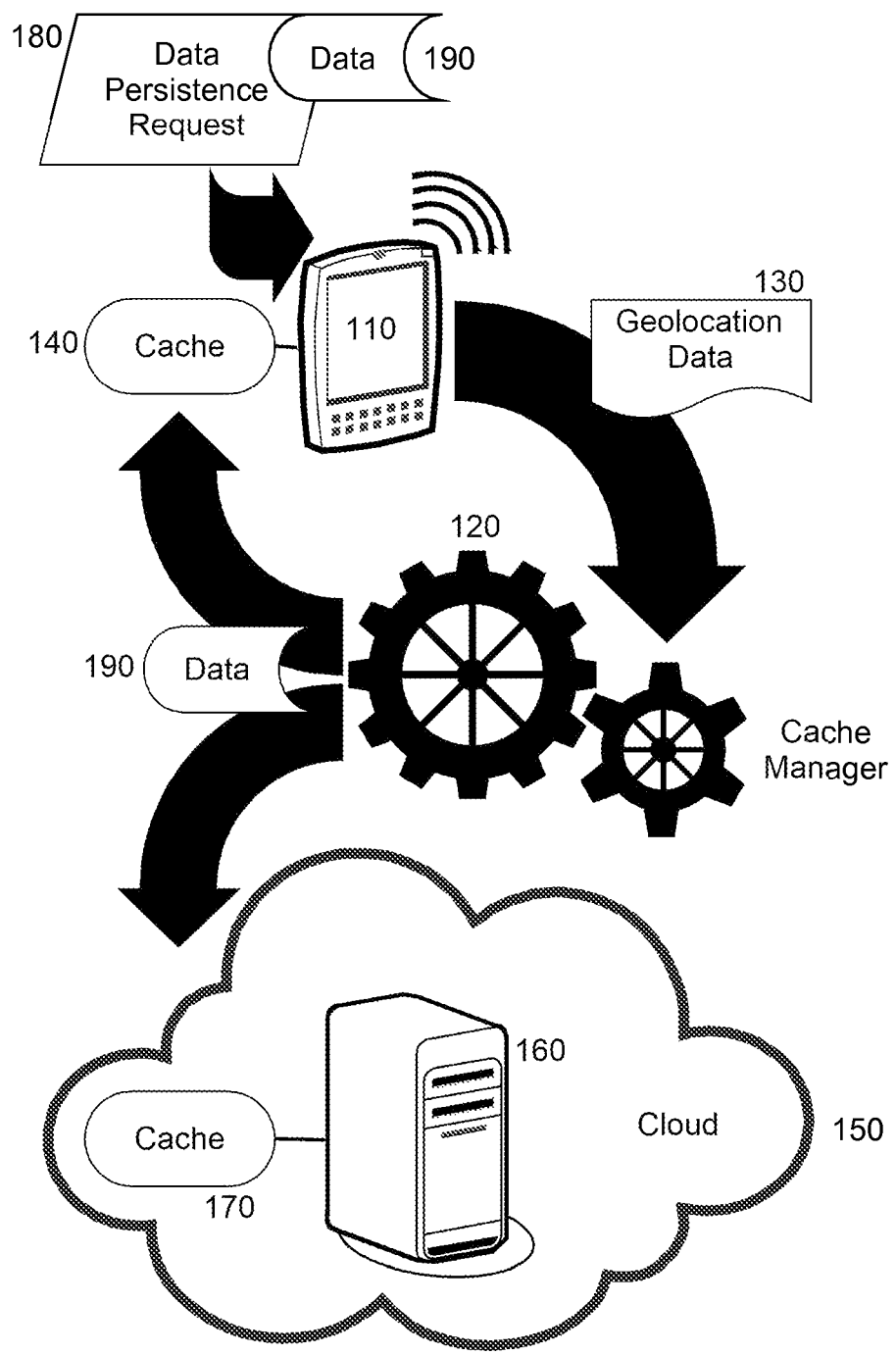
FIG. 1 is a pictorial illustration of a process for limiting client side data storage based upon client geolocation.

In further illustration, FIG. 1 is a pictorial illustration of a process for limiting client side data storage based upon client geolocation. As shown in FIG. 1, a data persistence request 180 in connection with data 190 is received in mobile device 110. The data persistence request 180 refers either to a request to store the data 190, a request to retrieve the data 190, or a request to cache the data 190. Contemporaneously, geolocation data 130 is received for the mobile device 110, for instance, global positioning system coordinates, or a specified location provide by an Internet service provider of the mobile device 110.

Cache manager 120 processes the data persistence request 180 by determining if the geolocation data 130 indicates the physical presence of the mobile device 110 in restricted geographic area. If so, the cache manager 120 directs the processing of the data 190 in connection with a cache 140 disposed within the mobile device 110. Otherwise, the cache manager 120 directs the processing of the data 190 in connection with a cache 170 disposed within a host server 160 in a computer communications network 150.

Figure 2:
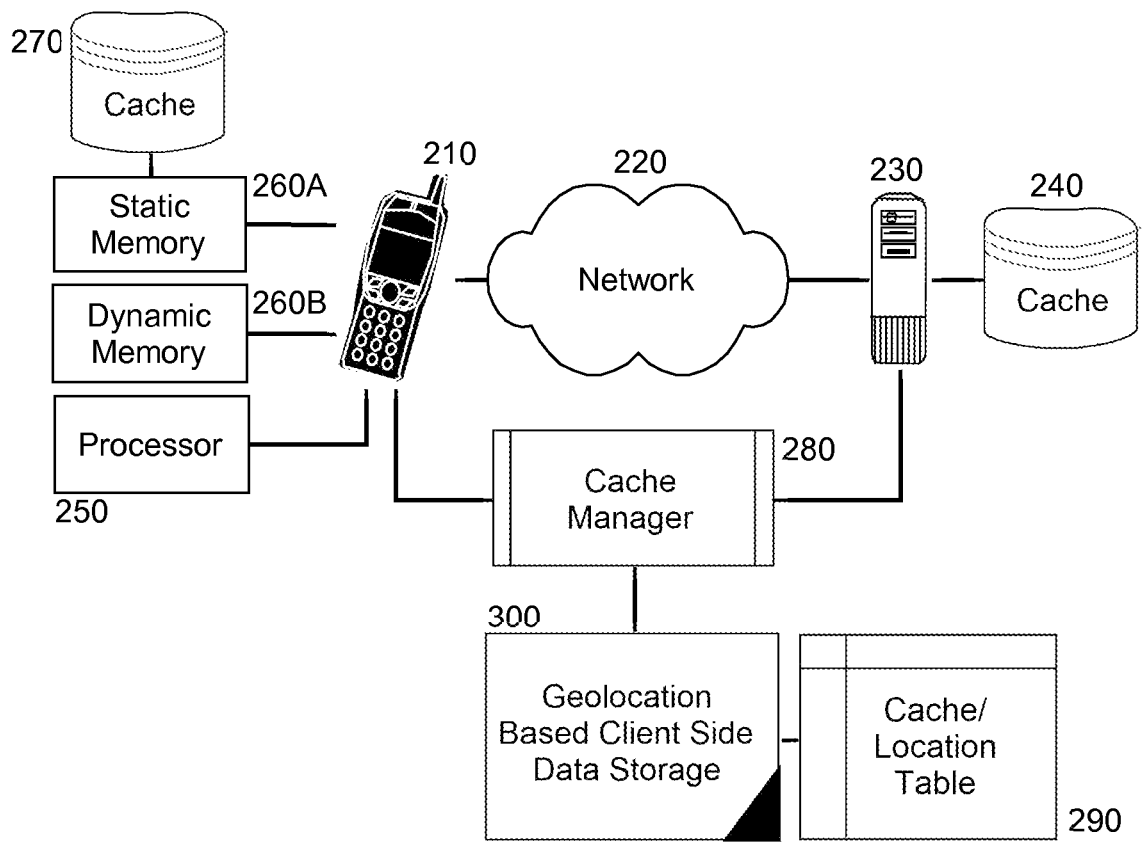
FIG. 2 is a schematic illustration of a data processing system configured for limiting client side data storage based upon client geolocation; and, FIG. 3 is a flow chart illustrating a process for limiting client side data storage based upon client geolocation.

The process described in connection with FIG. 1 is implemented in a data processing system. In yet further illustration, FIG. 2 schematically shows a data processing system configured for limiting client side data storage based upon client geolocation. The system includes a mobile computing device 210, such as a smart phone, smart watch, personal digital assistant, tablet computer or notebook or laptop computer. The mobile computing device 210 includes one or more processors 250 and memory 260A, 260B—both static memory 260A in which stored data is persisted irrespective of whether or not the mobile computing device 210 enjoys power, and also dynamic memory 260B in which data is persisted only temporarily in so far as the mobile computing device 210 enjoys power. The mobile computing device 210 additionally includes a cache 270 disposed in the static memory 260A.

The mobile computing device 210 is communicatively coupled to a host server 230 over computer communications network 220. The host server 230 also includes therein a cache 240. A cache manager 280 is coupled both to the mobile computing device 210 and the host server 230. For instance, the cache manager 280 can be disposed in the dynamic memory 260B of the mobile computing device 210. As another alternative, the cache manager 280 can be disposed in the host server 230. Or the cache manager 280 can be a remotely disposed service accessible to the mobile computing device 210 but independent of the mobile computing device 210 and the host server 230.

Of import, a geolocation based client side data storage module 300 is coupled to the cache manager 280. The module 300 includes program code enabled upon execution in memory of a computer to process a data persistence request for data received in the mobile computing device 210 by computing a contemporaneously determined geolocation of the mobile computing device 210 and comparing the geolocation to a restricted location in a cache location table 290 correlating locations with cache locations. To the extent that the geolocation is within the restricted location, the program code of the module 300 directs the processing of the data persistence request with respect to the cache 270, for instance by caching the data in the cache 270, or retrieving the data from the cache 270. Conversely, to the extent that the geolocation is within the restricted location, the program code of the module 300 directs the processing of the data persistence request with respect to the cache 240, for instance by caching the data in the cache 240, or retrieving the data from the cache 240.

Figure 3:
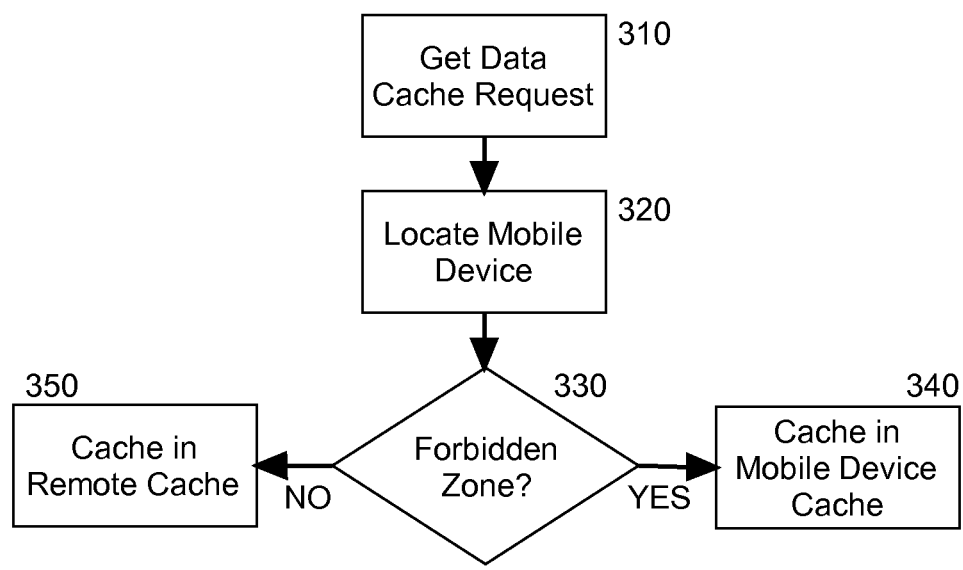

In even yet further illustration of the operation of the geolocation based client side data storage module 300, FIG. 3 is a flow chart illustrating a process for limiting client side data storage based upon client geolocation. Beginning in block 310, a data persistence request is received in the mobile computing device in connection with data. In block 320, a geolocation of the mobile computing device is determined. Thereafter, in decision block 330, it is determined if the mobile computing device is present within a restricted geographic area. If so, in block 340 the data persistence request is processed in connection with a cache disposed in the mobile computing device. Otherwise, in block 350 the data persistence request is processed in connection with a cache disposed remotely in a computer communications network.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for differentiated treatment of data at rest in a mobile device, the method comprising:

establishing a communicative link between the mobile device and a remotely disposed cache manager service;

receiving from the mobile device an indication of receipt of data in static memory of the mobile device from over a computer communications network;

retrieving from the mobile device in the remotely disposed cache manager service, a geolocation for the mobile device contemporaneous with the receipt of the data;

determining from the geolocation whether or not the mobile device is present within a restricted geographic zone in which caching of data outside of the mobile device is prohibited; and, responsive to determining that the mobile device is present within a restricted geographic zone, the remotely disposed cache manager service directing the caching of the received data in a cache in static memory of the mobile device instead of caching the received data in another cache disposed externally to the mobile device in memory of a server that is separate from the mobile device and separate from but communicatively linked to the remotely disposed cache manager service in the computer communications network, but otherwise caching the received data in the cache that is disposed externally to the mobile device.

2. The method of claim 1, further comprising:

receiving from the mobile device an indication of a request to retrieve data in the mobile device;

retrieving from the mobile device in the remotely disposed cache manager service, a geolocation for the mobile device contemporaneous with the receipt of the request;

determining from the geolocation whether or not the mobile device is present within the restricted geographic zone; and, responsive to determining that the mobile device is present within the restricted geographic zone, directing the mobile device to perform retrieving of the requested data from the cache in the mobile device, but otherwise directing the mobile device to perform requesting retrieval of the requested data from the cache that is disposed externally to the mobile device.

3. A data processing system configured for limiting client side data storage based upon client geolocation, the data processing system comprising:

a mobile computing device comprising both static and dynamic memory and at least one processor;

a cache disposed in the static memory of the mobile computing device and another cache disposed in memory of a server that is separate from the mobile computing device; and, a cache manager remotely disposed over a computer communications network from both the mobile computing device and the server, but coupled to both of the caches, the cache manager comprising program code enabled upon execution to receive a request to cache data, to retrieve a geolocation for the mobile device contemporaneous with the receipt of the request, to determine from the geolocation whether or not the mobile device is present within a restricted geographic zone in which caching of data outside of the mobile device is prohibited, and to respond to a determination that the mobile device is present within a restricted geographic zone, by caching of the data in the cache disposed in the static memory of the mobile device instead of caching the received data in a cache disposed externally to the mobile device, but otherwise by caching the data in the remotely disposed cache externally to the mobile device.

4. A computer program product for differentiated treatment of data at rest in a mobile device, the computer program product comprising a non-transitory computer readable storage medium having program instructions embodied therewith, the program instructions executable by a device to cause the device to perform a method comprising:

establishing a communicative link between the mobile device and a remotely disposed cache manager service;

receiving from the mobile device an indication of receipt of data in static memory of the mobile device from over a computer communications network;

retrieving from the mobile device in the remotely disposed cache manager service, a geolocation for the mobile device contemporaneous with the receipt of the data;

determining from the geolocation whether or not the mobile device is present within a restricted geographic zone in which caching of data outside of the mobile device is prohibited; and responsive to determining that the mobile device is present within a restricted geographic zone, the remotely disposed cache manager service directing the caching of the received data in a cache in static memory of the mobile device instead of caching the received data in another cache disposed externally to the mobile device in memory of a server that is separate from the mobile device and separate from but communicatively linked to the remotely disposed cache manager service in the computer communications network, but otherwise caching the received data in the cache that is disposed externally to the mobile device.

5. The computer program product of claim 4, wherein the method further comprises:

receiving from the mobile device an indication of a request to retrieve data in the mobile device;

retrieving from the mobile device in the remotely disposed cache manager service, a geolocation for the mobile device contemporaneous with the receipt of the request;

determining from the geolocation whether or not the mobile device is present within the restricted geographic zone; and, responsive to determining that the mobile device is present within the restricted geographic zone, directing the mobile device to perform retrieving of the requested data from the cache in the mobile device, but otherwise directing the mobile device to perform requesting retrieval of the requested data from the cache that is disposed externally to the mobile device.

* * * * *